(No Model.)

D. E. McSHERRY & H. G. SWOPE.
WHEELED HARROW.

No. 400,932. Patented Apr. 9, 1889.

Attest:
Sidney P. Hollingsworth
Horace A. Dodge.

Inventors:
Daniel E. McSherry
Horace G. Swope,
by Dodge & Son Attys

UNITED STATES PATENT OFFICE.

DANIEL E. McSHERRY AND HORACE G. SWOPE, OF DAYTON, OHIO, ASSIGNORS TO D. E. McSHERRY & CO., OF SAME PLACE.

WHEELED HARROW.

SPECIFICATION forming part of Letters Patent No. 400,932, dated April 9, 1889.

Application filed January 24, 1889. Serial No. 297,420. (No model.)

*To all whom it may concern:*

Be it known that we, DANIEL E. McSHERRY and HORACE G. SWOPE, citizens of the United States, residing at Dayton, in the county of Montgomery and State of Ohio, have invented certain new and useful Improvements in Wheeled Harrows, of which the following is a specification.

Our invention relates to that class of devices known as "wheeled harrows;" and it consists in the combination, with a wheeled harrow-frame or its described equivalent, of an adjustable seat-standard or support adapted and arranged substantially as shown and described, whereby the teeth of the harrow may be made to enter more deeply into the soil or raised entirely therefrom, as desired.

Figure 1:
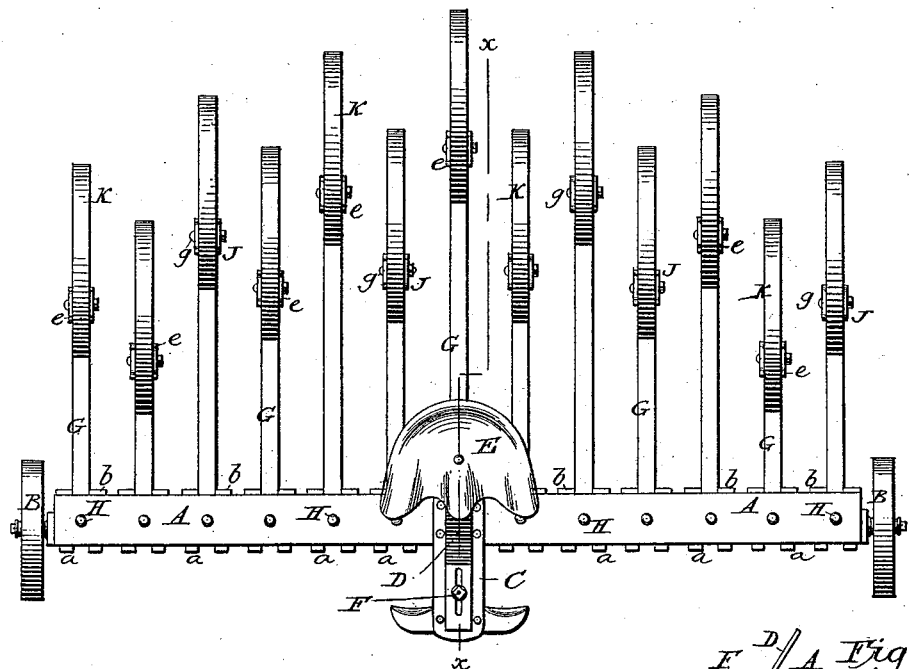
Figure 2:
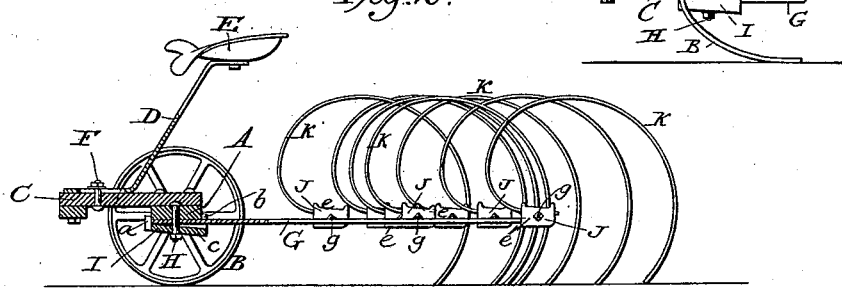
Figure 3:
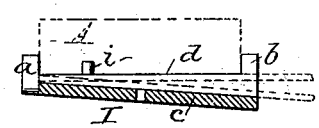
Figure 5:
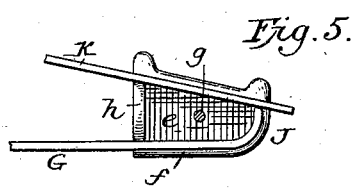
Figure 4:
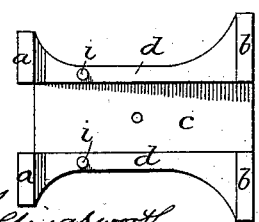
Figure 6:

In the accompanying drawings, Figure 1 is a top plan view of our improved harrow; Fig. 2, a sectional view of the same on the line X X of Fig. 1; Figs. 3 and 4, detail views of the clip by which the drag-bars are secured to the main frame of the machine; Figs. 5 and 6, similar views of the clip connecting the teeth to the drag-bars, and Fig. 7 a view showing the frame mounted upon runners in lieu of wheels.

The main frame of the harrow comprises a transverse bar or beam, A, provided at its ends with wheels or runners B B, and at its middle with a forwardly-extending bar, C, forming a support for the seat-standard D, and serving also as a foot-rest. The standard D is provided at its upper end with a seat, E, for the driver, and is slotted at its lower end, as shown in Figs. 1 and 2, to receive the bolt F, which latter is adapted to clamp the standard in any of its adjusted positions upon the bar C. The formation of the seat standard or support is a matter capable of considerable variation, and we do not wish to restrict ourselves to any particular form or construction of seat-standard, it being only necessary that the seat-standard shall have adjustment both forward and backward upon the bar C, so as to throw the weight of the driver in advance or in rear of the supporting wheels or runners, according as it is desired to elevate or depress the harrow-teeth. When at work, the seat-standard will be moved backward and the weight of the driver thrown upon the teeth to cause them to enter into the soil to a greater or less extent, according to the position to which the seat-standard is moved or adjusted. Of course no broad claim is made herein to an adjustable seat, *per se*, as these are old; but we believe that the construction and arrangement herein shown and described are new with us.

G indicates the drag-bars, which will advisably be made of flat bars of steel perforated at their forward end to receive a bolt, H, which passes also through the main beam A, as shown in Figs. 1 and 2.

I indicate clips, which are secured to the under side of the beam A by means of the bolt H, and serve to clamp the end of the drag-bar to the under side of the said beam. The clips I are provided at their forward ends with upwardly-projecting arms $a$, which embrace the front face of the bar or beam A, and at their rear ends with similar arms, $b$, which embrace the rear face of the said beam. The bottom $c$ of the clips I inclines downwardly from front to rear, as shown, so as to permit a limited movement of the drag-bar relatively to the standard and clip.

The side flanges, $d$, of the clip I bear squarely against the under side of the beam A, as shown in Figs. 2 and 3, and the said clips are held firmly in position upon the beam by means of the bolt H, which passes through the said beam and clip.

On the top of the side flanges, $d$ $d$, are cast lugs $i$, which enter the under side of the beam A and prevent side-play or lateral motion of the clips.

The rear ends of the drag-bars G are curved upwardly, as shown in Fig. 5, and are embraced on their sides by a clip, J, comprising two plates, $e$ $e$, which have along their lower edges on their inner faces an inwardly-projecting flange, $f$, upon which the drag-bars rest, as clearly shown in Figs. 5 and 6. The two plates of the clips J are drawn together by means of a bolt, $g$, which draws the two parts $e$ $e$ firmly toward each other and against the sides of the drag-bars. The harrow-teeth K are curved, as shown, and are likewise embraced at their inner ends between the plates $e\ e$ of the clip J, as shown in Figs. 5 and 6, the said teeth K being held in position by means of the bolt $g$. By loosening the bolt $g$ the clip can be adjusted lengthwise upon the drag-bars and the teeth adjusted relatively to the clip. The drag-bars G and the teeth K are kept a proper distance apart by means of lugs $h$, cast upon the inner faces of the plates $e\ e$, as shown in Figs. 5 and 6.

From the foregoing construction it will be seen that we possess a riding-harrow simple and cheap in construction and one that requires no lifting-lever and attendant parts.

The runners which we have illustrated in Fig. 7 we consider the inferior equivalent of the wheels as a support for the main frame.

Having thus described our invention, what we claim is—

1. In combination with the beam A and the rearwardly-extending drag-bars provided with harrow-teeth, the wheels or runners supporting said beam, and an adjustable seat standard or support mounted upon said beam, whereby the teeth may be raised out of the soil or caused to enter therein, according as the standard is moved forward or backward.

2. In combination with the frame A, supported upon wheels or runners and having the rearwardly-extending drag-bars and teeth, the adjustable seat-standard provided with a seat, and means for locking the said standard in its adjusted positions.

3. In combination with beam A and wheels or runners B, bar C, projecting from the beam A, a seat-standard, D, provided with a seat, E, means for securing the seat-standard to the bar C, and drag-bars provided with harrow-teeth and extending rearwardly from the bar A, as shown.

4. In a harrow, the combination, with a frame and its wheels or runners, of a series of drag-bars extending rearwardly of the wheels (or runners) and provided with harrow-teeth, and a seat-standard adjustably secured to the frame in advance of the wheels, (or runners,) as and for the purpose set forth.

5. In a harrow, the combination, with a main frame and its wheels or runners, of the elastic or yielding drag-bars G, projecting in rear of the main frame and provided with harrow-teeth K and an adjustable seat-support in advance of the bearing-point of the wheels or runners.

6. In combination with beam A and drag-bars G, the clips I, provided with arms $a\ b$, to clasp the front and rear faces of the beam, and provided also with an inclined bottom, $c$, and a bolt, H, passing through the beam, drag-bar, and clip.

7. The clip I, comprising arms $a\ b$, to clasp the front and rear faces of the beam, an inclined bottom, $c$, and side flanges, $d\ d$, provided with lugs $i$.

In witness whereof we hereunto set our hands in the presence of two witnesses.

DANIEL E. McSHERRY.
HORACE G. SWOPE.

Witnesses:
  WALTER A. KING,
  S. BOLTIN.